(12) United States Patent
Hansen

(10) Patent No.: US 6,378,546 B1
(45) Date of Patent: Apr. 30, 2002

(54) FRESH WATER STORAGE APPARATUS

(76) Inventor: Neil A. Hansen, 1031 Capitol St., Ogden, UT (US) 84401

( * ) Notice: Subject to any disclaimer, the term of this patent is extended or adjusted under 35 U.S.C. 154(b) by 0 days.

(21) Appl. No.: 09/693,883

(22) Filed: Oct. 20, 2000

(51) Int. Cl.[7] .................................................. F04F 1/06
(52) U.S. Cl. ........................ 137/208; 137/209; 137/376
(58) Field of Search ................................. 137/206, 208, 137/209, 376

(56) References Cited

U.S. PATENT DOCUMENTS

| | | | | |
|---|---|---|---|---|
| 808,083 A | * | 12/1905 | Groom | 137/208 |
| 858,602 A | * | 7/1907 | Hopkins | 137/208 X |
| 1,240,373 A | * | 9/1917 | Roszkowski | 127/208 |
| 1,867,892 A | * | 7/1932 | Rice | 137/376 X |
| 2,551,501 A | * | 5/1951 | Mitchell et al. | 137/376 X |
| 3,626,970 A | * | 12/1971 | Jones | 137/209 |
| 3,643,678 A | | 2/1972 | Genrich | |
| 4,239,054 A | * | 12/1980 | Van Rijn | 137/209 |
| 4,576,552 A | * | 3/1986 | Smith | 137/209 X |
| 4,922,943 A | * | 5/1990 | Gill | 137/209 X |
| 5,032,290 A | | 7/1991 | Yamagata et al. | |
| 5,261,440 A | * | 11/1993 | Frank | 137/208 X |
| 5,309,938 A | | 5/1994 | Ellgoth et al. | |
| D353,436 S | | 12/1994 | Hess | |
| 5,769,124 A | | 6/1998 | Ehrhardt | |
| 5,819,784 A | | 10/1998 | Yoon | |
| D415,553 S | | 10/1999 | Wolfe | |

* cited by examiner

Primary Examiner—Gerald A. Michalsky

(57) ABSTRACT

A fresh water storage apparatus for providing an emergency supply of fresh water. The fresh water storage apparatus includes one or more tanks having a first end and a second end; and also includes support members upon which the one or more tanks are mounted; and further includes a water inlet assembly being mounted to and extending into the one or more tanks; and also includes a water outlet assembly being mounted to and extending into said at least one tank; and further includes a vent assembly being mounted upon and extending into the one or more tanks through a top thereof.

14 Claims, 4 Drawing Sheets

FRESH WATER STORAGE APPARATUS

BACKGROUND OF THE INVENTION

1. Field of the Invention

The present invention relates to a portable fresh water storage and more particularly pertains to a new fresh water storage apparatus for providing an emergency supply of fresh water.

2. Description of the Prior Art

The use of a portable fresh water storage is known in the prior art. More specifically, a portable fresh water storage heretofore devised and utilized are known to consist basically of familiar, expected and obvious structural configurations, notwithstanding the myriad of designs encompassed by the crowded prior art which have been developed for the fulfillment of countless objectives and requirements.

Known prior art includes U.S. Pat. No. 5,03:2,290; U.S. Pat. No. 5,309,938; U.S. Pat. No. Des. 353,436; U.S. Pat. No. Des. 415,553; U.S. Pat. No. 5,769,124; U.S. Pat. No. 5,819,784; and U.S. Pat. No. 3,643,678.

While these devices fulfill their respective, particular objectives and requirements, the aforementioned patents do not disclose a new fresh water storage apparatus. The inventive device includes one or more tanks having a first end and a second end; and also includes support members upon which the one or more tanks are mounted; and further includes a water inlet assembly being mounted to and extending into the one or more tanks; and also includes a water outlet assembly being mounted to and extending into said at least one tank; and further includes a vent assembly being mounted upon and extending into the one or more tanks through a top thereof.

In these respects, the fresh water storage apparatus according to the present invention substantially departs from the conventional concepts and designs of the prior art, and in so doing provides an apparatus primarily developed for the purpose of providing an emergency supply of fresh water.

SUMMARY OF THE INVENTION

In view of the foregoing disadvantages inherent in the known types of portable fresh water storage now present in the prior art, the present invention provides a new fresh water storage apparatus construction wherein the same can be utilized for providing an emergency supply of fresh water.

The general purpose of the present invention, which will be described subsequently in greater detail, is to provide a new fresh water storage apparatus which has many of the advantages of the portable fresh water storage mentioned heretofore and many novel features that result in a new fresh water storage apparatus which is not anticipated, rendered obvious, suggested, or even implied by any of the prior art portable fresh water storage, either alone or in any combination thereof.

To attain this, the present invention generally comprises one or more tanks having a first end and a second end; and also includes support members upon which the one or more tanks are mounted; and further includes a water inlet assembly being mounted to and extending into the one or more tanks; and also includes a water outlet assembly being mounted to and extending into said at least one tank; and further includes a vent assembly being mounted upon and extending into the one or more tanks through a top thereof.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new fresh water storage apparatus which has many of the advantages of the portable fresh water storage mentioned heretofore and many novel features that result in a new fresh water storage apparatus which is not anticipated, rendered obvious, suggested, or even implied by any of the prior art portable fresh water storage, either alone or in any combination thereof.

It is another object of the present invention to provide a new fresh water storage apparatus which may be easily and efficiently manufactured and marketed.

It is a further object of the present invention to provide a new fresh water storage apparatus which is of a durable and reliable construction.

An even further object of the present invention is to provide a new fresh water storage apparatus which is susceptible of a low cost of manufacture with regard to both materials and labor, and which accordingly is then susceptible of low prices of sale to the consuming public, thereby making such fresh water storage apparatus economically available to the buying public.

Still yet another object of the present invention is to provide a new fresh water storage apparatus which provides in the apparatuses and methods of the prior art some of the advantages thereof, while simultaneously overcoming some of the disadvantages normally associated therewith.

Still another object of the present invention is to provide a new fresh water storage apparatus for providing an emergency supply of fresh water.

Yet another object of the present invention is to provide a new fresh water storage apparatus which includes one or more tanks having a first end and a second end; and also includes support members upon which the one or more tanks are mounted; and further includes a water inlet assembly being mounted to and extending into the one or more tanks; and also includes a water outlet assembly being mounted to and extending into said at least one tank; and further includes a vent assembly being mounted upon and extending into the one or more tanks through a top thereof.

Still yet another object of the present invention is to provide a new fresh water storage apparatus that effectively stores clean water for use during emergencies.

Even still another object of the present invention is to provide a new fresh water storage apparatus that is easy and convenient to set up in a basement of a home or a garage.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
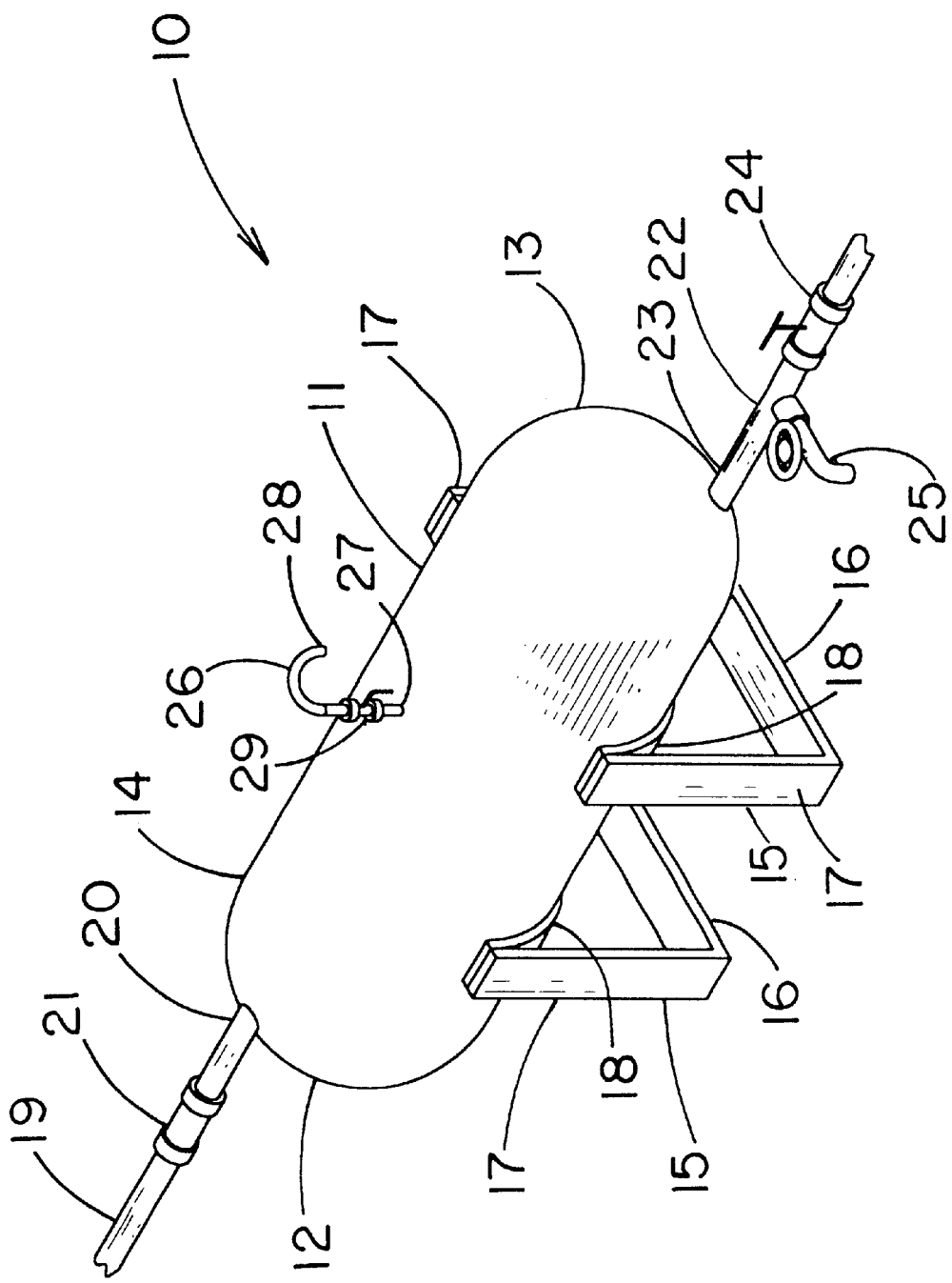
FIG. 1 is a perspective view of a new fresh water storage apparatus according to the present invention.
Figure 2:
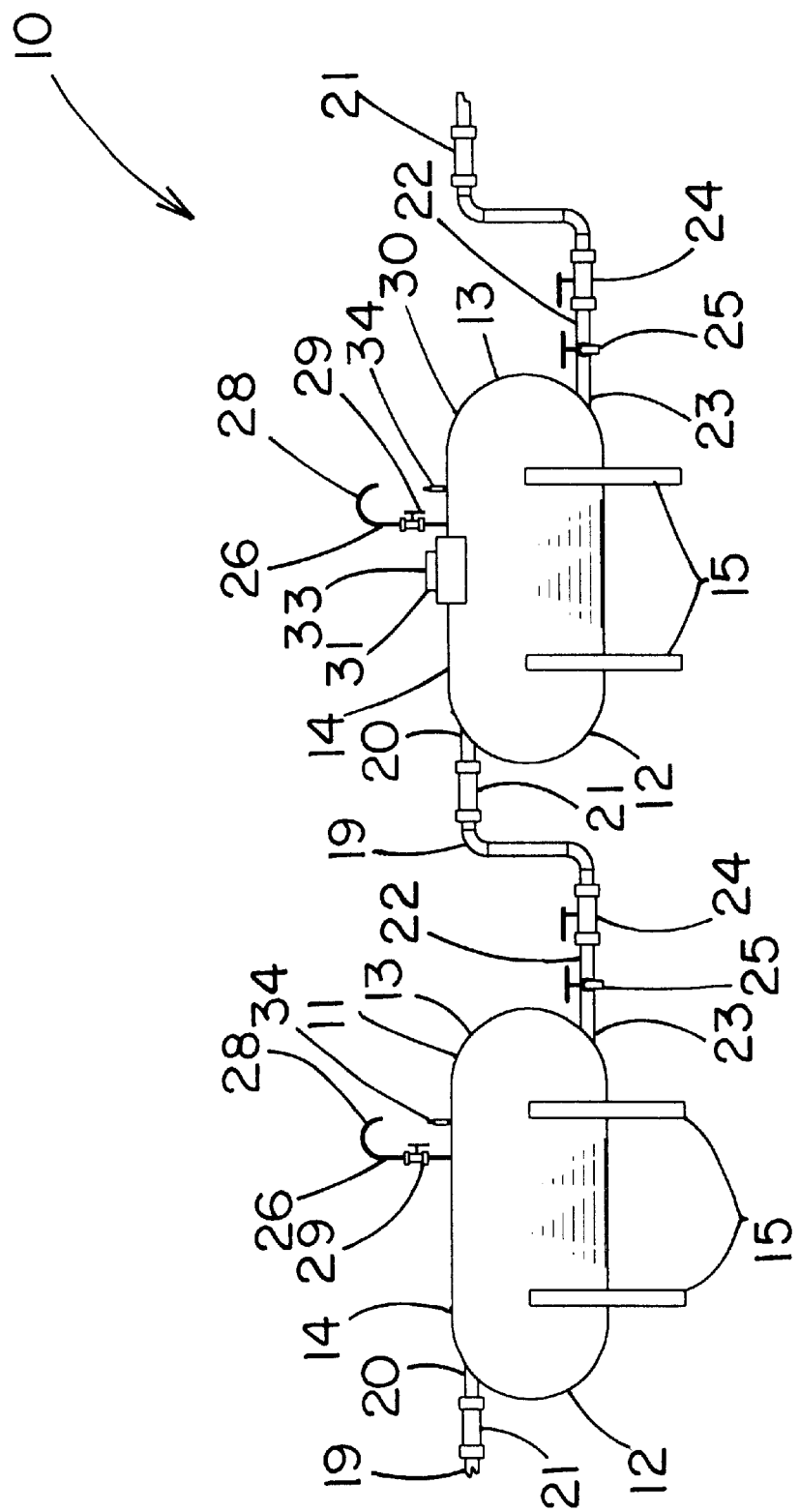
FIG. 2 is a side elevational view of the present invention.
Figure 3:
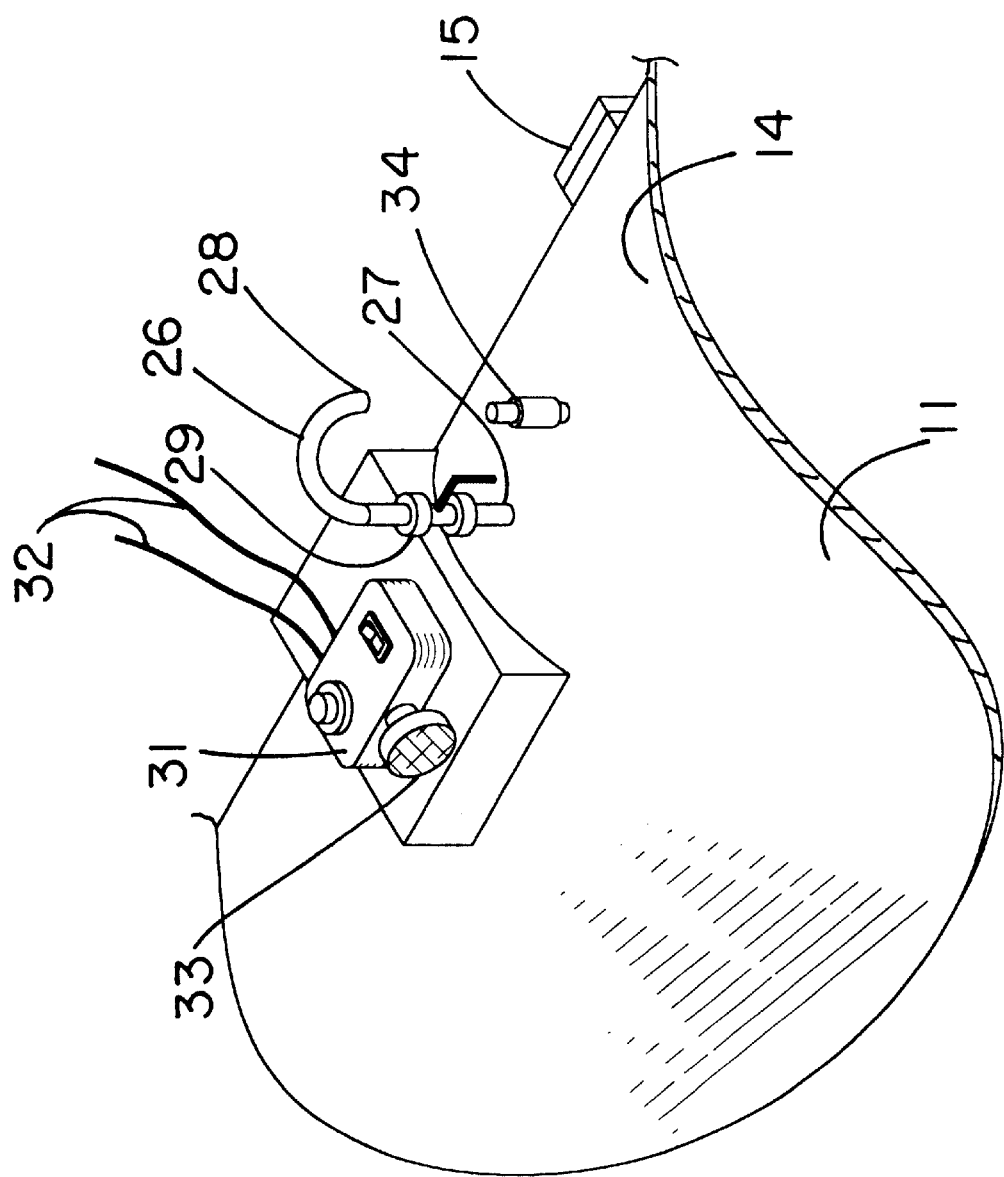
FIG. 3 is a partial perspective view of a second embodiment of the present invention.
Figure 4:
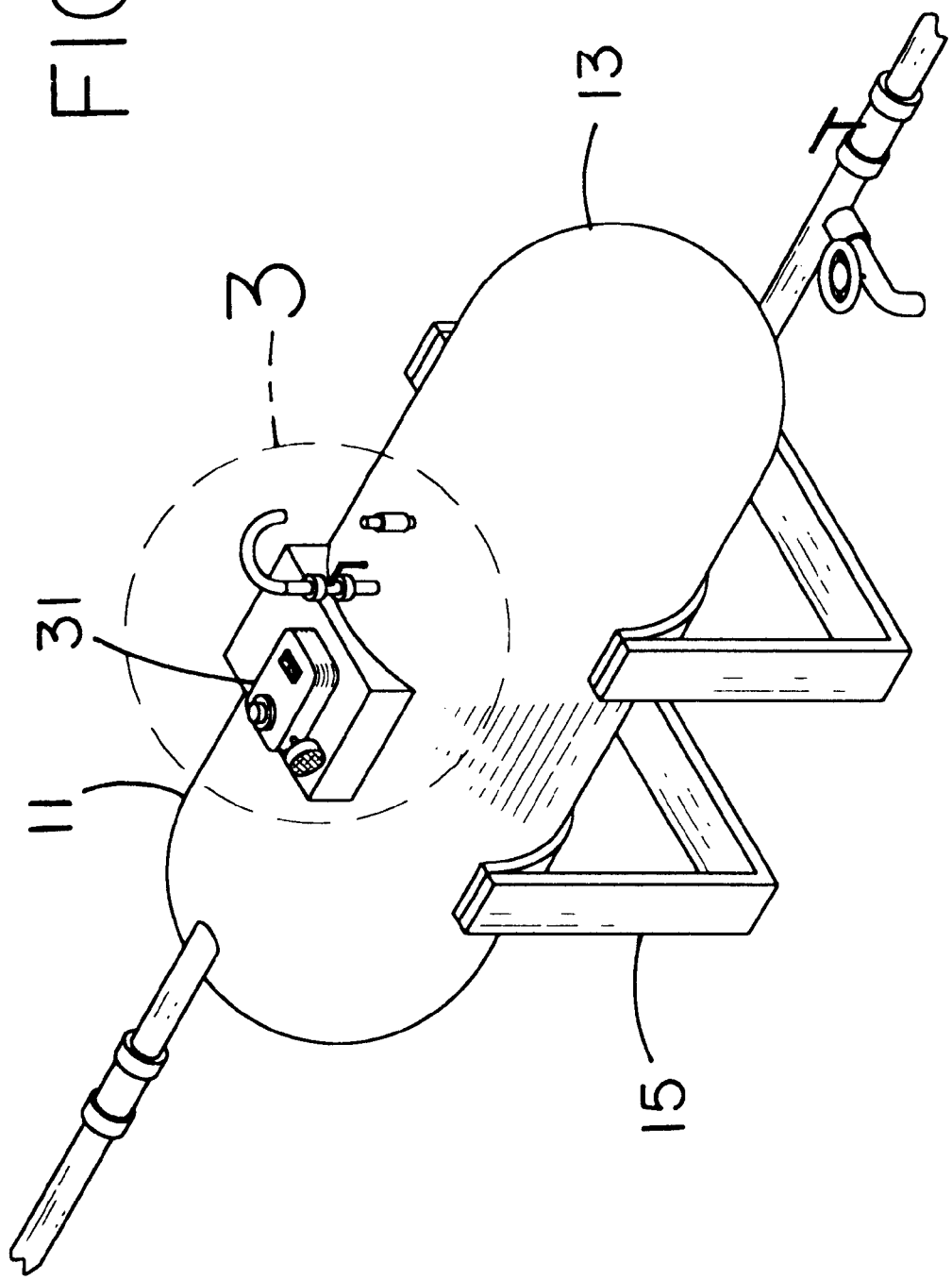
FIG. 4 is a perspective view of the second embodiment of the present invention.

With reference now to the drawings, and in particular to FIGS. 1 through 4 thereof, a new fresh water storage apparatus embodying the principles and concepts of the present invention and generally designated by the reference numeral 10 will be described.

As best illustrated in FIGS. 1 through 4, the fresh water storage apparatus 10 generally comprises a tank 11 having a first end 12 and a second end 13; and also comprises support members 15 upon which the tank 11 is mounted. Each of the support members 15 includes an elongate base member 16 having ends, and also includes a pair of elongate upright members 17 being securely and conventionally attached to the ends of the elongate base member 16 and extending upwardly therefrom, and further includes a curved cross member 18 being securely and conventionally attached to top ends of the elongate upright members 17 and extending there between and being suspended above the elongate base member 16 and being adapted to support the tank 11.

A water inlet assembly is conventionally mounted to and extending into the tank 11. The water inlet assembly includes a first tubular member 19 having an end portion 20 extending through the first end 12 near a top of the tank 11, and also includes a back-flow check valve 21 being conventionally disposed inline of the first tubular member 19 to prevent water from flowing backwards from the tank 11.

A water outlet assembly is conventionally mounted to and extending into the tank 11. The water outlet assembly includes a second tubular member 22 having an end portion 23 which extends through the second end 13 near a bottom of the tank 11, and also includes a first ball valve 24 being conventionally disposed inline of the second tubular member 22, and further includes a spigot 25 being securely and conventionally disposed through a side wall of the second tubular member 22 between the tank 11 and the ball valve 24 for receiving and regulating a flow of water from the tank 11.

A vent assembly is securely and conventionally mounted upon and extending into the tank 11. The vent assembly includes a third tubular member 26 having a first end portion 27 being securely disposed through the top 14 of the tank 11, and also includes a second ball valve 29 being conventionally disposed inline of the third tubular member 26. The third tubular member 26 also has a curved second end portion 28.

As a second embodiment, the fresh water storage apparatus 10 includes a first tank 11 and a second tank 30 with the second tubular member 22 of the first tank 11 being securely and conventionally connected to the first tubular member 19 of the second tank 30.

As another embodiment, the vent assembly further includes a pressure release valve 34 being securely and conventionally disposed through the top 14 of the tank 11, and also includes an air compressor member 31 being securely and conventionally mounted upon and being disposed in the tank 11 and having wires 32 extending outwardly therefrom, and further includes an air filter member 33 being conventionally attached to the air compressor member 31 for filtration of water being stored in the tank 11.

In use, the user fills the tank 11 with water through the first tubular member 19. The vent assembly keeps the water stored in the tank 11 fresh, and when needed, the water is dispensed through the spigot 25.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A fresh water storage apparatus comprising:

at least one tank having a first end and a second end;

a water inlet assembly being mounted to and extending into said at least one tank;

a water outlet assembly being mounted to and extending into said at least one tank; and a vent assembly being mounted upon and extending into said at least one tank;

wherein said water outlet assembly includes a tubular outlet member having an end portion which extends through said second end near a bottom of said at least one tank, and also includes a first valve being disposed inline of said tubular outlet member, and further includes a spigot disposed through a side wall of said tubular outlet member between said at least one tank and said first valve for receiving and regulating a flow of water out of said tubular outlet member independent of any flow of water through said first valve.

2. A fresh water storage apparatus as described in claim 1, additionally comprising support members upon which said at least one tank is mounted, wherein each of said support members includes an elongate base member having ends, and also includes a pair of elongate upright members being securely attached to said ends of said elongate base member and extending upwardly therefrom, and further includes a curved cross member being securely attached to top ends of said elongate upright members and extending there between and being suspended above said elongate base member and being adapted to support said at least one tank.

3. A fresh water storage apparatus as described in claim 1, wherein said water inlet assembly includes a tubular inlet member having an end portion extending through said first end near a top of said at least one tank, and also includes a back-flow check valve being disposed inline of said tubular inlet member to prevent water from flowing backwards from said at least one tank.

4. A fresh water storage apparatus as described in claim 1, wherein said vent assembly includes a tubular vent member having a first end portion being disposed through said top of said at least one tank, and also includes a second valve being disposed inline of said tubular vent member, said tubular vent member also having a curved second end portion.

5. A fresh water storage apparatus as described in claim 4, wherein said vent assembly further includes a pressure release valve being securely disposed through said top of said at least one tank, and also includes an air compressor member being securely mounted upon and being disposed in said at least one tank and having wires extending outwardly therefrom, and further includes an air filter member being attached to said air compressor member for filtration of water being stored in said at least one tank.

6. A fresh water storage apparatus as described in claim 1, wherein said at least one tank includes a first and second tank and wherein the water outlet assembly of said first tank is in communication the water inlet assembly of said second tank such that water flowing out of said first tank through the water outlet assembly thereof flows into said second tank through the water inlet outlet thereof.

7. A fresh water storage apparatus comprising:
at least one tank having a first end and a second end;
support members upon which said at least one tank is mounted, each of said support members including an elongate base member having ends, and also including a pair of elongate upright members being securely attached to said ends of said elongate base member and extending upwardly therefrom, and further including a curved cross member being securely attached to top ends of said elongate upright members and extending therebetween and being suspended above said elongate base member and being adapted to support said at least one tank;
a water inlet assembly being mounted to and extending into said at least one tank, said water inlet assembly including a first tubular member having an end portion extending through said first end near a top of said at least one tank, and also including a back-flow check valve being disposed inline of said first tubular member to prevent water from flowing backwards from said at least one tank;
a water outlet assembly being mounted to and extending into said at least one tank, said water outlet assembly including a second tubular member having an end portion which extends through said second end near a bottom of said at least one tank, and also including a first ball valve being disposed inline of said second tubular member, and further including a spigot disposed through a side wall of said second tubular member between said at least one tank and said ball valve for receiving and regulating a flow of water out of said tubular outlet member independent of any flow of water through said first valve; and
a vent assembly being mounted upon and extending into said at least one tank, said vent assembly including a third tubular member having a first end portion being disposed through said top of said at least one tank, and also including a second ball valve being disposed inline of said third tubular member, said third tubular member also having a curved second end portion.

8. A fresh water storage apparatus as described in claim 7, wherein said at least one tank includes a first and second tank and wherein the water outlet assembly of said first tank is in communication the water inlet assembly of said second tank such that water flowing out of said first tank through the water outlet assembly thereof flows into said second tank through the water inlet outlet thereof.

9. A fresh water storage apparatus as described in claim 7, wherein said vent assembly further includes a pressure release valve being securely disposed through said top of said at least one tank, and also includes an air compressor member being securely mounted upon and being disposed in said at least one tank and having wires extending outwardly therefrom, and further includes an air filter member being attached to said air compressor member for filtration of water being stored in said at least one tank.

10. A fresh water storage apparatus comprising:
a first tank and a second tank each having a first end and a second end, each of said tanks including:
a water inlet assembly being mounted to and extending into said tank;
a water outlet assembly being mounted to and extending into said tank; and
a vent assembly being mounted upon and extending into said tank;
wherein the water outlet assembly of said first tank is in communication the water inlet assembly of said second tank such that water flowing out of said first tank through the water outlet assembly thereof flows into said second tank through the water inlet assembly thereof;
wherein said water outlet assembly of each of said tanks includes a tubular outlet member having an end portion which extends through said second end near a bottom of each of said tanks, and also includes a first valve being disposed inline of said second tubular member, and further includes a spigot disposed through a side wall of said tubular outlet member between each of said tanks and said first valve for receiving and regulating a flow of water from each of said tanks.

11. A fresh water storage apparatus as described in claim 10, additionally comprising support members upon which each of said tanks is mounted, wherein each of said support members includes an elongate base member having ends, and also includes a pair of elongate upright members being attached to said ends of said elongate base member and extending upwardly therefrom, and further includes a curved cross member being attached to top ends of said elongate upright members and extending therebetween and being suspended above said elongate base member and being adapted to support each of said tanks.

12. A fresh water storage apparatus as described in claim 10, wherein said water inlet assembly of each of said tanks includes a tubular inlet member having an end portion extending through said first end near a top of each of said tanks, and also includes a back-flow check valve being disposed inline of said tubular inlet member to prevent water from flowing backwards from each of said tanks.

13. A fresh water storage apparatus as described in claim 10, wherein said vent assembly includes a tubular vent member having a first end portion being disposed through said top of each of said tanks, and also includes a second valve being disposed inline of said tubular vent member, said tubular vent member also having a curved second end portion.

14. A fresh water storage apparatus as described in claim 13, wherein said vent assembly further includes a pressure release valve being disposed through said top of each of said tanks, and also includes an air compressor member being mounted upon and being disposed in one of said tanks and having wires extending outwardly therefrom, and further includes an air filter member being attached to said air compressor member for filtration of water being stored in each of said tanks.

* * * * *